United States Patent
Wierda

[11] Patent Number: 6,028,409
[45] Date of Patent: Feb. 22, 2000

[54] CONTROL SYSTEM FOR TELEMANIPULATION

[75] Inventor: Gerhard Johan Wierda, Zwaanshoek, Netherlands

[73] Assignee: Fokker Control Systems B.V., Schiphol, Netherlands

[21] Appl. No.: 09/210,724

[22] Filed: Dec. 15, 1998

[30] Foreign Application Priority Data

Dec. 17, 1997 [EP] European Pat. Off. .............. 97203978

[51] Int. Cl.$^7$ ........................................................ B25J 9/16
[52] U.S. Cl. .................................. 318/568.1; 318/568.12; 360/78.09; 395/800.31; 395/96
[58] Field of Search ..................................... 318/560–696, 318/69; 360/78.09, 78.06; 901/3, 5, 7, 13, 18, 23; 395/80–98, 800.31

[56] References Cited

U.S. PATENT DOCUMENTS

| | | |
|---|---|---|
| 3,845,284 | 10/1974 | Taguchi et al. . |
| 4,218,172 | 8/1980 | Freund . |
| 4,797,835 | 1/1989 | Kurami et al. ............................ 364/513 |
| 4,812,722 | 3/1989 | Corrothers ............................... 318/561 |
| 4,826,392 | 5/1989 | Hayati ...................................... 414/730 |
| 5,038,089 | 8/1991 | Szakaly . |
| 5,825,308 | 10/1998 | Rosenberg ................................ 341/20 |
| 5,949,608 | 9/1999 | Hunter .................................. 360/78.09 |

FOREIGN PATENT DOCUMENTS

| | | |
|---|---|---|
| 0 440 202 | 8/1991 | European Pat. Off. . |
| 2146801 | 4/1985 | United Kingdom . |
| 2187867 | 9/1987 | United Kingdom . |

*Primary Examiner*—Paul Ip
*Attorney, Agent, or Firm*—Young & Thompson

[57] ABSTRACT

Remote control system comprising two circuits each containing an actuator acting on a mass and controlled by an actuator signal, a manual control means coupled to said actuator, a force transducer measuring the force applied to said manual control means, a velocity transducer measuring the velocity of the manual control means, a control circuit representing a model of the dynamics of a moving mass the input signal of which is divided by a simulated mass to obtain a commanded acceleration signal, which is time integrated to obtain a commanded velocity signal, an actuator controller the input signal of which is the balance between the commanded velocity signal and the velocity of the manual control means. The balance of the two measured forces is applied as input signal to both circuits.

23 Claims, 4 Drawing Sheets

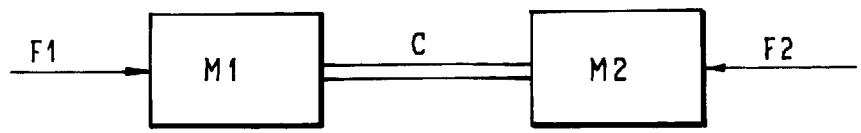
fig-1
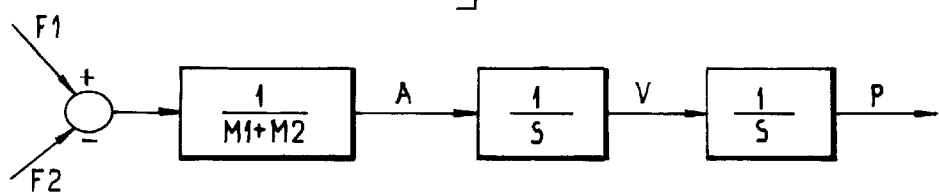
fig-2
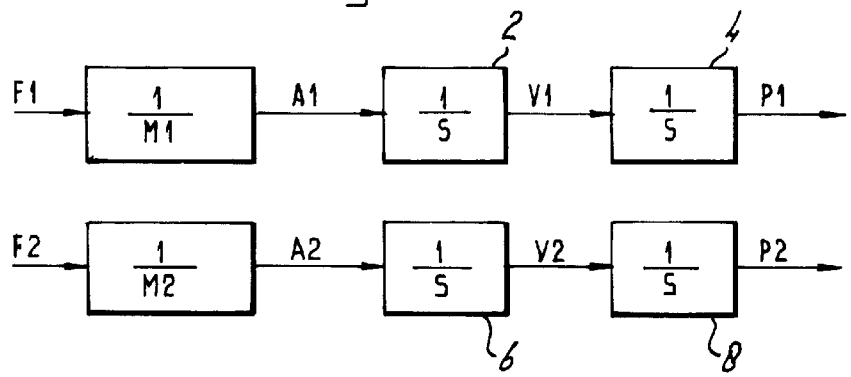
fig-3
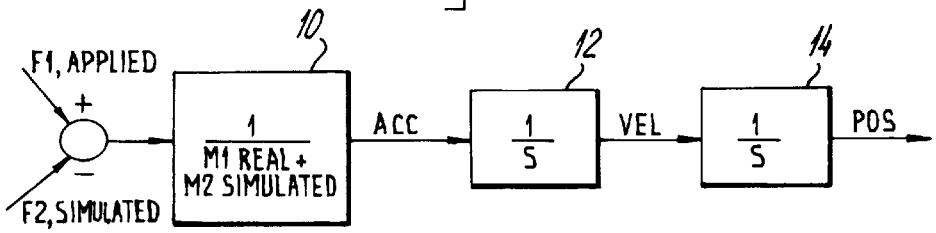
fig-4
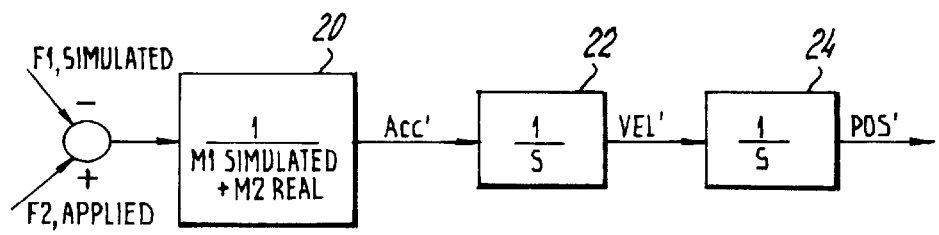

CONTROL SYSTEM FOR TELEMANIPULATION

BACKGROUND OF THE INVENTION

The invention relates to the field of robotics and more specific to manipulators used for the remote handling of objects.

As such telemanipulation control systems are known. Several embodiments are described in "Developments of new force reflecting control schemes and an application to a teleoperation training simulator" by Won S. Kim in Proceedings of the 1992 IEEE International Conference on Robotics and Automation, May 1992. In this article several classes of systems are distinguished.

In a first class of prior art controllers, the so-called force reflecting (FR) controllers, the position of the remote manipulator (slave) is controlled by a human operator through a master arm, while the contact forces in the slave are sensed by a force sensor and are reflected back to the master arm. Due to stability problems the force reflection gain is limited to approximately 1/10, i.e. when the remote manipulator arms senses 10 N the operator can only sense 1 N.

A second class of prior art controllers is based on the so-called shared compliance control (SCC). This type of control makes the robot more compliant by low pass filtering the force from the sensor. In this way the force reflection gain can be increased.

A third class of prior art controllers uses a combination of FR and SCC.

A fourth class of prior art controllers uses the position error based force reflection, where the force reflection is made proportional to the position error between the commanded and actual position of the slave arm.

The fifth class of prior art controllers is a combination of SCC and position error based force reflection.

A common characteristic of all the above-described prior art controllers is that these controllers use the commanded position of the human operator (the manual controller) as a commanded position (setpoint position) for the remote arm. All the prior art controllers are therefore essentially position controllers, dependent on the control (and therefore the existence) of a position error between the commanded position (human operator) and the actual position of the remote manipulator arm. Dependent on the class of prior art controllers this position error is noticeable (for example feels as a damped spring) between hand controller and remote controller and does not allow accurate positioning and "feel" due to this compliance.

U.S. Pat. No. 5,116,180 describes a telemanipulation system where only the force from the remote manipulator arm is sensed and fed back to the hand controller.

The international patent application WO-9510080 describes a system where a force is calculated based on position only.

U.S. Pat. No. 5,004,391 describes a system where only the force from the remote manipulator arm is sensed and fed back to the hand controller.

The article "A new Robot for High Dexterity Microsurgery" by P. S. Schenker et al., Proceedings of the first International Conference of CVRMed'95, April 1995, describes a system based on position control only.

SUMMARY OF THE INVENTION

An object of the invention is now to provide a control system for telemanipulation comprising two manipulators, one to be used by the human operator and the other to be used for the remote control of objects, whereby the two manipulators act as if the are linked by a linkage having a virtual infinite stiffness allowing for a very precise control of the remote manipulator such that the human operator gets the feeling as if he in fact operates the remote manipulator through said simulated infinite stiff link.

In agreement with this object the invention now provides a system comprising
   a first circuit containing:
      a first actuator acting on a first mass and controlled by a first actuator signal,
      a first manual control means coupled to said first actuator
      a first force transducer measuring the force applied on the first manual control means,
      a first velocity transducer measuring the velocity of the first manual control means,
      a first control circuit representing a model of the dynamics of a moving mass the input signal of which is divided by a simulated mass to obtain a first commanded acceleration signal, which is time integrated to obtain a first commanded velocity signal,
      a first actuator controller the input signal of which is the balance between the first commanded velocity signal and the velocity of the first manual control means,
   a second circuit containing:
      a second actuator acting on a second mass and controlled by a second actuator signal,
      a second manual control means coupled to said second actuator,
      a second force transducer measuring the force applied on the second manual control means,
      a second velocity transducer measuring the velocity of the second manual control means,
      a second control circuit representing a model of the dynamics of a moving mass the input signal of which is divided by a simulated mass to obtain a second commanded acceleration signal, which is time integrated to obtain a second commanded velocity signal,
      a second actuator controller the input signal of which is the balance between the second commanded velocity signal and the velocity of the second manual control means,
whereby
   the simulated mass in the first and second control circuit is a simulation of the sum of the first mass and the second mass
and whereby
   the balance of the two measured forces is applied as input signal to the first and second control circuits.

In this system two masses are employed which are not physically connected but are coupled through a control system such that the two masses have dynamics as if they were physically connected. The applied forces are reflected at both masses and the resultant feel, acceleration, velocity, and position of both masses are then identical to that of a lumped mass system.

In order to simulate the dynamics of a pure mass the invention also provides a model follower comprising
   an actuator acting on a mass and controlled by a first actuator signal,
   a manual control means coupled to said actuator
   a force transducer measuring the force applied on the manual control means, a velocity transducer measuring the velocity of the manual control means, a control circuit representing a model of the dynamics of a moving mass the input signal of which is divided by a simulated mass to obtain a commanded acceleration signal, which is time integrated to obtain a commanded velocity signal, an actuator controller the input signal of which is the balance between the commanded velocity signal and the velocity of the manual control means.

BRIEF DESCRIPTION OF THE DRAWINGS

The invention will be explained in more detail with reference to the attached drawings.

FIG. 1 illustrates a system with two masses which are physically connected.

FIG. 2 illustrates an equivalent model of the system in FIG. 1.

FIG. 3 illustrates two basic force responding systems which are not coupled.

FIG. 4 illustrates the situation in which both systems act as if they are coupled.

DETAILED DESCRIPTION

Figure 5:
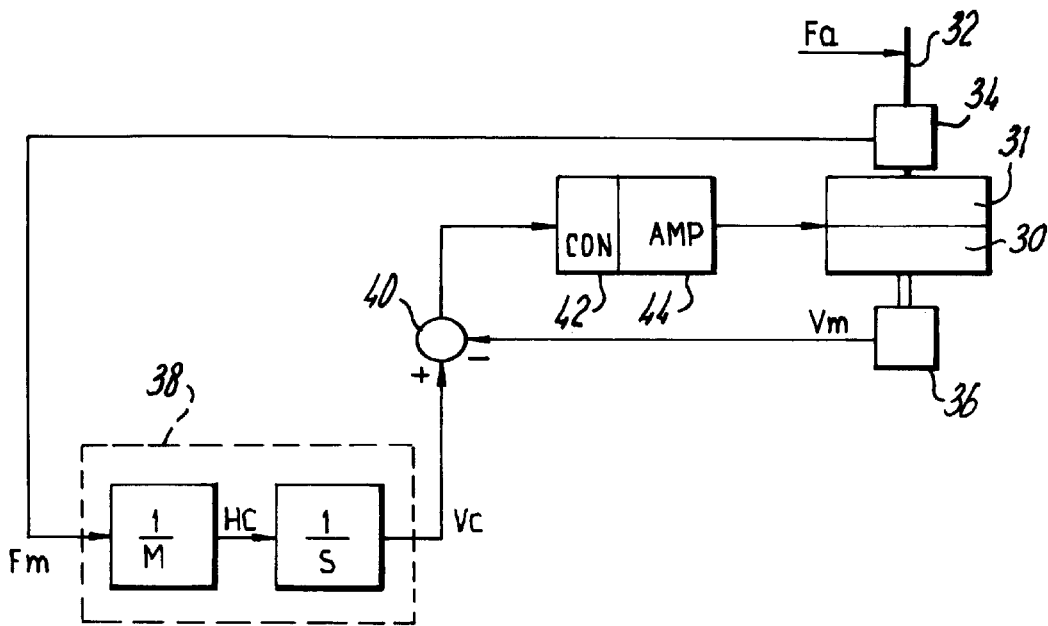
FIG. 5 illustrates an embodiment of the model follower used within the system according to the invention.

To explain the functioning of the system according to the invention first of all the attention is drawn to FIG. 1 showing two masses M1 and M2 which are connected by a physical connection C with an assumed infinite stiffness and zero mass. A force F1 acting on mass M1 is for example applied by the operator's hand while force F2 acting on mass M2 is for instance applied by an object. Due to the infinite stiffness of the coupling C the two masses can be lumped as is done in the equivalent model of this system shown in FIG. 2. The balance of the two forces F1 and F2 acts on the simulated lumped masses 1/(M1+M2) generating thereby an acceleration A. Through an integrator (1/S) the velocity V is obtained and through a further integrator (1/S) the position P of the combined masses is obtained.

If there is no physical connection C in FIG. 1, then FIG. 1 illustrates in fact two completely independent systems, a first system in which a force F1 acts on a mass M1 and the second system in which a force F2 acts on a mass M2. The equivalent thereof is illustrated in FIG. 3.

In FIG. 3 the force F1 acts on a first mass (represented by 1/M1) resulting into an acceleration A1. By integrating (1/S) the acceleration A1 in an integrator 2 the velocity V1 is obtained and by further integration (1/S) in an integrator 4 the position P1 is obtained. In the second system in FIG. 3 the force F2 acts on the second mass (represented by 1/M2) resulting into an acceleration A2. Integrating (1/S) the acceleration A2 in integrator 6 results into a velocity V2 and integrating the velocity V2 in a further integrator 8 provides the position P2.

In agreement with the invention based on the configuration illustrated in FIG. 3 now the configuration illustrated in FIG. 4 is designed. As in FIG. 3 the system illustrated in FIG. 4 comprises two subsystems. The first subsystem comprises the lumped masses 10, represented by 1/(M1 real+M2 simulated), and two integrators 12 and 14. In a node 16 the sum of the actual applied force F1 and the measured force F2 is determined and the resulting sum force signal acts on mass 10. As a result thereof the mass 10 will obtain an acceleration Acc, which through integration in integrator 12 can be converted into a velocity Vel and through further integration in integrator 14 provides the position Pos.

In the same manner the second subsystem in FIG. 4 comprises the lumped mass 20, represented by 1/(M1 simulated+M2 real) and two integrators 22 and 24. In node 26 the sum of the simulated force F1 and the actual applied force F2 is determined and the resulting sum force signal acts on the mass 20 resulting into an acceleration Acc'. By integrating twice in integrators 22 and 24 the velocity Vel' and the position Pos' are found.

If it may be assumed that in FIG. 4

M1 simulated=M1 real

M2 simulated=M2 real

F1 simulated=F1 applied

F2 simulated=F2 applied then Acc=Acc', Vel=Vel' and Pos=Pos'.

In that case the resultant feel, experienced by the human operator acting through the manual control means on the one actuator is the same as if the human operator was in fact acting on the object, handled by the other actuator. The human operator feels the dynamics of the mass M1 and the dynamics of the mass M2 as if the are connected by an infinite stiff link with zero mass as in FIG. 2. Vice versa the object "feels" the applied force as if both masses are connected by an infinite stiff link with zero mass.

The system in FIG. 4 relies on the use of simulated forces. For the simulation the masses need to be connected to an electric, hydraulic or pneumatic actuator as is illustrated in FIG. 5. The model follower illustrated in FIG. 5 enables the simulation of the dynamics of a pure mass. The actuator 30 acts on a mass 31. The mass 31 in FIG. 5 (for example a rotary electric actuator) is equipped with an output arm 32 by means of which operations (in this case only linear operations) can be performed. Between the arm 32 and the mass 31 a force transducer 34 is installed for measuring the force Fa applied to the operating arm 32 by the human operator. Furthermore the actuator 30 is coupled to a tachometer 36 or other velocity sensing means for measuring the velocity Vm with which the mass and therewith the operating arm moves momentarily. In stead of a tachometer, measuring the velocity directly, the velocity can be determined indirectly by integrating the acceleration or differentiating the position of the actuator 30.

As soon as a force Fa is applied manually to the operating arm 32 the force sensor 34 will generate a signal Fm representing the measured force and will supply this signal to a model follower control system 38. The model follower control system 38 contains a model of the desired dynamics, in this case a model of the mass M. The signal Fm is divided by said mass to obtain a commanded acceleration signal Ac. This commanded acceleration signal Ac is time integrated (1/S) resulting into a commanded velocity signal Vc.

As indicated the actuator 30 is connected to a tachometer 36 which provides a measured velocity signal Vm indicating the actual velocity with which the mass 31 and therewith the arm 32 is moving.

Both the commanded velocity signal Vc and the measured velocity signal Vm are compared to each other in a comparator 40 and the resulting velocity error signal is supplied to an actuator control circuit comprising the controller 42 and an amplifier 44 supplying at its output the actuator control signal to the actuator 30. If the controller 42, the amplifier 44, and the actuator 30 are properly selected, the mass 31 and therewith the arm 32 will accelerate such that it obtains the commanded velocity. It will be clear that the functioning of this model follower is clearly dependent both on the applied force Fa as well as the mass M, representing the desired dynamics inside the controller 38. Preferably but not necessary the controller 42 is a PI controller.

Figure 6:
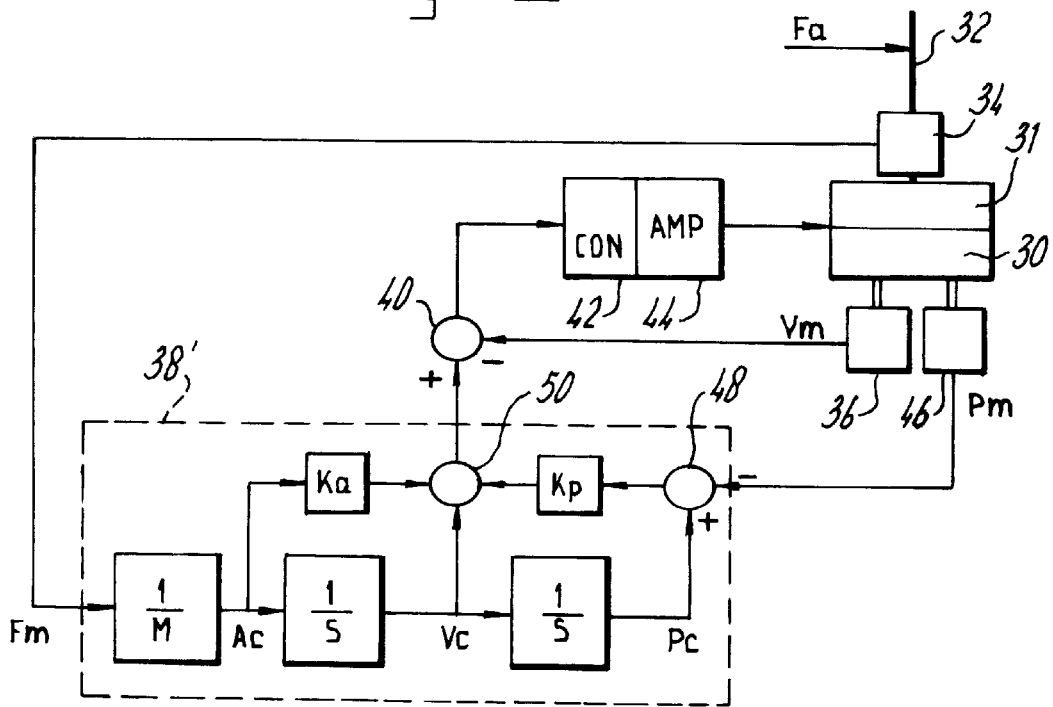
FIG. 6 illustrates a more sophisticated embodiment of the model follower used in the system according to the invention.

To avoid any uncertainty in relation to the position of the arm 32 it is preferred to apply the further developed embodiment illustrated in FIG. 6. All components which are also present in the embodiment in FIG. 5 are indicated by the same reference numbers. Added in FIG. 6 is a position sensor 46 providing a measured position signal Pm. Furthermore the model follower control system 38' has some additions for correcting purposes as will be explained in the following.

In the model follower control system 38' the measured force signal Fm is first of all converted in an commanded acceleration signal Ac and thereafter converted into a commanded velocity signal Vc in the same way as was performed in FIG. 5. Then the commanded velocity signal Vc is time integrated again resulting into a commanded position signal Pc. This signal Pc is compared in comparator 48 with the measured position signal Pm resulting into a position error signal which, after attenuation/amplification by Kp is delivered to node 50. In node 50 the commanded velocity vc is corrected by this position error signal. This effectively compensates for any possible drift.

To compensate for the limited bandwidth of the actuator 30 phase lead can be obtained by adding the commanded acceleration signal Ac, after attenuation or amplification by Ka, to the commanded velocity Vc also in node 50. Finally, just as in FIG. 5, the (now corrected) commanded velocity signal Vc is compared with the measured velocity signal Vm in comparator 40 and the resulting velocity error signal is used, through controller 42 and amplifier 44 to control the actuator 30.

Figure 7:
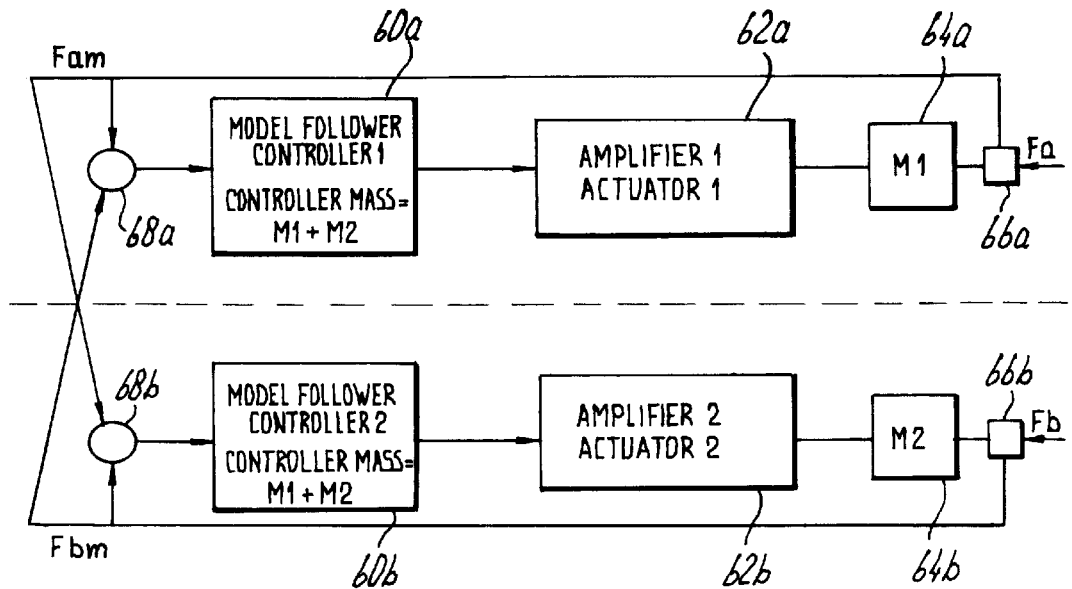
FIG. 7 illustrates a general diagram of a system according to the invention.
Figure 8:
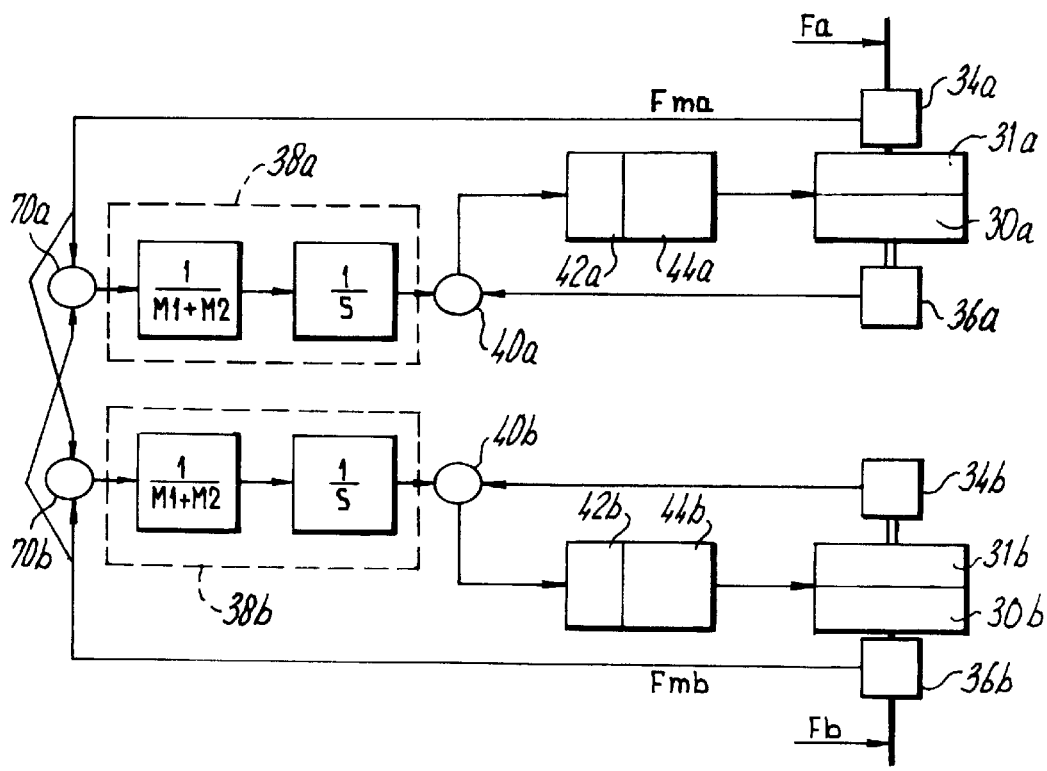
FIG. 8 illustrates a detailed embodiment of a system according to the invention.

If the schematic diagram in FIG. 4 is combined with a model follower as illustrated in FIG. 5 or more preferably illustrated in FIG. 6, then the schematic diagram in FIG. 7 is obtained. This diagram illustrates two subsystems, which are crosswise connected. The first subsystem comprises the model follower control system 60a, the amplifier 62a, the mass 64a, the force sensor 66a, and a node 68a. The second subsystem comprises the model follower control system 60b, the amplifier 62b, the mass 64b, the force sensor 66b, and a node 68b. The force Fa applied on the mass 64a is measured by the force sensor 66a. The measured signal Fam is applied both to node 68a as well as to node 68b. The force Fb acting on mass 64b is measured by force sensor 66b. The measured signal Fbm is applied both to node 68a and to node 68b. A more detailed embodiment of the schematical diagram illustrated in FIG. 7 is shown in FIG. 8. In FIG. 8 the model follower illustrated in FIG. 5 is applied twice. The simulated masses in both model follower control systems 38a and 38b are set to M1+M2. In FIG. 8 all the components which are already known from FIG. 5 are indicated by the same reference numbers followed by either "a" for the first subsystem or "b" for the second subsystem. The measured force signal Fam measured by the force transducer 34a is applied to a node 70a together with the measured force signal Fbm provided by force transducer 34b. Both measured force signals are also provided to node 70b. The output signals from both nodes 70a and 70b are delivered to the model follower control systems 38a and 38b respectively.

If the operator applies a force Fa to the force sensor 34a connected to mass M1 (31a), then both actuators 30a and 30b and their coupled masses 31a and 31b (M1 and M2) will accelerate by Fa/(M1+M2) to obtain the commanded velocity. The human operator feels M1+M2 connected through an infinite stiff link with zero mass.

Figure 9:
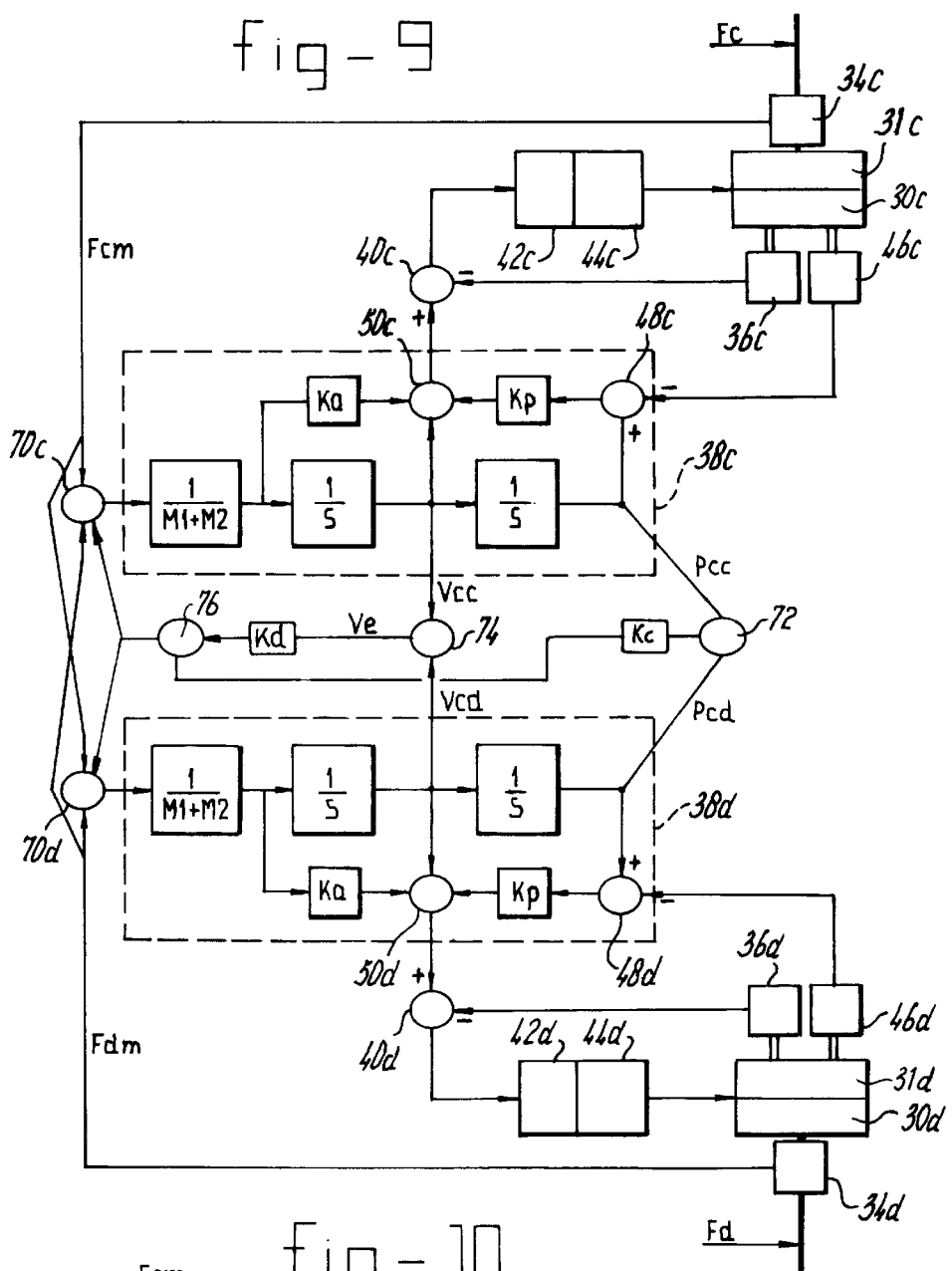
FIG. 9 illustrates a further detailed embodiment of a system according to the invention.

As already said it is preferred to use the mass follower illustrated in FIG. 6. A dual circuit on the basis of FIG. 7, whereby the follower circuit of FIG. 6 is applied twice, is illustrated in FIG. 9. The various components belonging to both subsystems illustrated in FIG. 9 are indicated by the same reference numbers as in FIG. 6 whereby for the first subsystem these numbers are followed by "c" and for the second subsystem these reference numbers are followed by "d". A detailed discussion about the functioning of the whole system is considered superfluous. To assure that any component tolerances will not lead during operating to position errors or velocity errors between both subsystems the actual position signals Pcc from subsystem c and Pcd from subsystem d are compared in comparator 72 resulting into a position error signal Pe. In the same manner the velocity signal Vcc from subsystem c and the velocity signal Vcd from subsystem d are compared in comparator 74 resulting into a velocity error signal Ve. After attenuation/amplification by Kc the position error signal is supplied to node 76 where it is combined with the velocity error signal, which eventually is amplified/attenuated by Kd. The resulting signal at the output of node 76 is supplied as correction to nodes 70c and 70d. Therewith the system strives to a situation in which Ve and Pe remain zero.

Instead of the command position and velocity signals Pcc, Pcd, Vcc and Vcd the measured position and velocity signals at the outputs of the sensors 36c, 36d, 46c, 46d can be used for deriving error signals Pe' and Ve'. This embodiment is not illustrated separately.

Up to now it is assumed that only the masses M1 and M2 can have different values whereas the acceleration A, the velocity V and the position P of these masses is the same in both subsystems. However, the forces, velocities and positions can be scaled to obtain special effects. A simple example would be the software implementation of a mechanical gearbox that amplifies the forces while reducing the position with a factor G, the gearing ratio. In that case the manually operated controller would be connected to the slave actuator through an infinitely stiff virtual gearbox. This feature can for instance be used to make the operator more sensitive when handling a delicate remote object or to make the operator more powerful when handling heavy objects. An example based on the embodiment of FIG. 9 is illustrated in FIG. 10.

Figure 10:
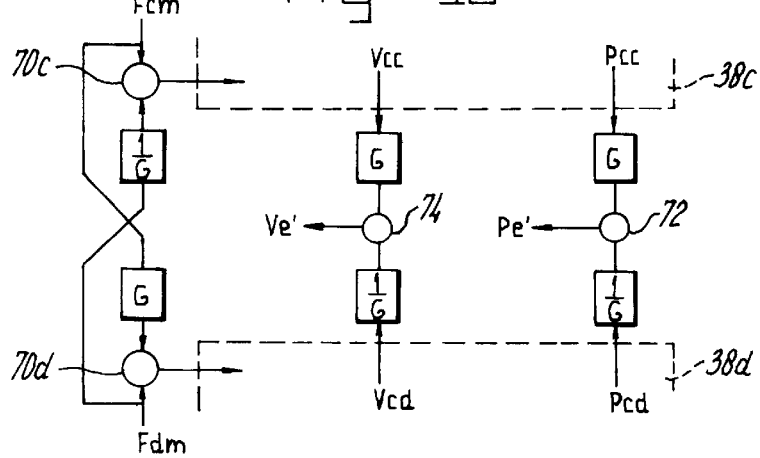
FIG. 10 illustrates a further detailed embodiment of a system according to the invention.

In FIG. 10 only the central part of the circuit in FIG. 9 is illustrated. Node 70c receives the force signal Fcm as well as the force signal Fdm which is divided by G. The bounced signal forms the input signal for control circuit 38c. The node 70d receives the force signal Fdm as well as the other force signal Fcm, which is multiplied by G. The balance of these signals at the output of node 70d is used as input signal for control circuit 38d.

If a velocity error signal Ve and a position error signal Pe are generated as in FIG. 9 then a modification of the circuit is necessary as is illustrated in FIG. 10. The velocity signal Vcc is provided to node 74 after it is multiplied by G. The velocity signal Vcd is provided to the node 74 after it is divided by G. The resulting error signal Ve' is (after attenuation or amplification) supplied to both nodes 70c and 70d.

The position signal Pcc is first multiplied by G and then provided to node 72. The position signal Pcd is divided by G and then applied to node 72. The resulting error signal Pe' is (after attenuation or amplification) delivered to both nodes 70c and 70d.

It is remarked that the above-mentioned gearing ratio G can be a constant factor or a function of an arbitrary variable x, expressed as G(x), or any other function.

The above-described control system reflects a single degree of freedom. In the case multiple degrees of freedom have to be used in the remote manipulator each of the joints of the remote manipulator can be equipped with the above-described control system and then connected to equivalent joints of a multiple degree of freedom manual controller also being equipped with the control system according to the invention. In many cases it will be possible to combine a number of the force transducers such that this number is smaller then the number of degrees of freedom, resulting into a reduction of costs.

In that case a calculation is performed to estimate the force at the joint. The estimated forces are then cross connected as described and illustrated in FIGS. 7, 8.

I claim:

1. Remote control system comprising
   a first circuit containing:
      a first actuator acting on a first mass and controlled by a first actuator signal,
      a first manual control means coupled to said first actuator
      a first force transducer measuring the force applied on the first manual control means,
      a first velocity transducer measuring the velocity of the first manual control means,
      a first control circuit representing a model of the dynamics of a moving mass the input signal of which is divided by a simulated mass to obtain a first commanded acceleration signal, which is time integrated to obtain a first commanded velocity signal,
      a first actuator controller the input signal of which is the balance between the first commanded velocity signal and the velocity of the first manual control means,
   a second circuit containing:
      a second actuator acting on a second mass and controlled by a second actuator signal,
      a second manual control means coupled to said second actuator,
      a second force transducer measuring the force applied on the second manual control means,
      a second velocity transducer measuring the velocity of the second manual control means,
      a second control circuit representing a model of the dynamics of a moving mass the input signal of which is divided by a simulated mass to obtain a second commanded acceleration signal, which is time integrated to obtain a second commanded velocity signal,
      a second actuator controller the input signal of which is the balance between the second commanded velocity signal and the velocity of the second manual control means,
   whereby
      the simulated mass in the first and second control circuit is a simulation of the sum of the first mass and the second mass and whereby
      the balance of the two measured forces is applied as input signal to the first and second control circuits.

2. Remote control system according to claim 1, characterised in that the first velocity signal is time integrated to obtain a first commanded position signal and the second velocity signal is time integrated to obtain a second commanded position signal,
   that the first circuit comprises furthermore
      a first position transducer determining the position of the first manual control means
      a comparator for comparing the first position transducer output signal with the first commanded position signal resulting into an error signal which is provided to the first actuator controller, and
   that the second circuit comprises furthermore
      a second position transducer determining the position of the second manual control means
      a comparator for comparing the second position transducer output signal with the second commanded position signal resulting into an error signal which is provided to the second actuator controller.

3. Remote control system according to claim 2, characterised in that both error signals are attenuated or amplified before being provided to the respective controller.

4. Remote control system according to claim 1, characterised in that in the first circuit the first commanded acceleration signal is applied to the first controller and in the second circuit the second commanded acceleration signal is applied to the second controller.

5. Remote control system according to claim 4, characterised in that the first and second commanded acceleration signals are attenuated or amplified before being provided to the respective controller.

6. Remote control system according to claim 1, characterised in that the system comprises a comparator for comparing the first and second commanded velocity signal resulting in an error signal which is applied to the first and second actuator controllers.

7. Remote control system according to claim 6, characterised in that the error signal is attenuated or amplified before being provided to the first and second actuator controllers.

8. Remote control system according to claim 2, characterised in that the system comprises a comparator for comparing the first and second commanded position signal resulting in an error signal which is applied to the first and second actuator controllers.

9. Remote control system according to claim 8, characterised in that the error signal is attenuated or amplified before being provided to the first and second actuator controllers.

10. Remote control system according to claim 6, characterized in that instead of the commanded velocity and position signals the measured velocity and position signals, supplied by the respective transducers, are used to derive the mentioned error signals.

11. Remote control system according to claim 1, characterised in that the actuator controllers are embodied as PI controllers.

12. Remote control system according to claim 1, characterised in that
    the first circuit receives the balance of the force measured by the first force transducer and the force measured by the second force transducer divided by a predetermined function, and that
    the second circuit receives the balance of the force measured by the second force transducer and the force measured by the first force transducer multiplied by said predetermined function.

13. Remote control system according to claim 12 referring back to claim 6, characterised in that the first commanded velocity signal is multiplied by said predetermined function and the second commanded velocity signal is divided by said function before these signals are applied to said comparator.

14. Remote control system according to claim 12 referring back to claim 8, characterised in that the first commanded position signal is multiplied by said predetermined function and the second commanded position signal is divided by said function before these signals are applied to said comparator.

15. Remote control system according to claim 11, characterized in that the function is a constant factor, i.e. a gearing ratio.

16. Remote control system according to claim 11, characterized in that the function is dependent on one or more arbitrary variables.

17. Remote control system according to claim 1, characterised in that in each circuit the velocity transducer is omitted and that the respective velocity signal is obtained as an estimation based on the position or acceleration signals obtained from the respective transducers.

18. Remote control system comprising a number of the systems as described in claim 1 to control a corresponding number of degrees of freedom.

19. Control system according to claim 18, characterised in that at least a number of the necessary force transducers is combined into one transducer measuring multiple degrees of freedom.

20. Model follower control system comprising an actuator acting on a mass and controlled by a first actuator signal, a manual control means coupled to said actuator a force transducer measuring the force applied on the manual control means, a velocity transducer measuring the velocity of the manual control means, a control circuit representing a model of the dynamics of a moving mass the input signal of which is divided by a simulated mass to obtain a commanded acceleration signal, which is time integrated to obtain a commanded velocity signal, an actuator controller the input signal of which is the balance between the commanded velocity signal and the velocity of the manual control means.

21. Model follower control system according to claim 20, characterised in that, the follower furthermore comprises a position detecting means providing a sensed position signal a comparator comparing the sensed position signal and time integrated commanded velocity signal resulting into a position error signal which is, together with the commanded velocity signal provided to the actuator controller.

22. Model follower control system according to claim 20, characterised in that, the commanded acceleration signal together with commanded velocity signal and the position error signal is provided to the actuator controller.

23. Model follower control system according to claim 20, characterised in that the actuator controller is embodied as a PI controller.

* * * * *